Patented May 26, 1953

2,640,064

UNITED STATES PATENT OFFICE 2,640,064

BROMOALKYLSILANES AND THEIR PREPARATION

John L. Speier, Jr., Pittsburgh, Pa., assignor to Dow Corning Corporation, Midland, Mich., a corporation of Michigan No Drawing. Application June 8, 1950, Serial No. 166,989

6 Claims. (Cl. 260—448.2)

The present invention relates to novel bromomethylsilanes and to a method for producing bromomethyl- and bromoethylsilanes.

Heretofore, it has been found impossible to brominate methyl- and ethylsilanes using methods conventional in chlorination procedures. Repeated attempts to brominate such silanes have failed under all usual conditions which are effective in the chlorination of methyl- and ethylsilanes.

An object of the present invention is to produce bromomethylsilanes.

Another object of the present invention is to provide a simple and efficient method for brominating methyl- and ethylsilanes and further to provide such a method in which all the bromine used forms bromides, thus avoiding the loss of valuable bromine in the form of HBr.

In accord with the present invention the bromomethylsilanes hereof are of the general formula $(CH_3)_a(BrCH_2)SiCl_{3-a}$ where $a$ has a value of from 1 to 3 inclusive.

These bromomethylsilanes may be produced in accord with the method hereof. This method comprises contacting a mixture of chlorine and bromine with a compound of the general formula $R_{a+1}SiCl_{3-a}$ in fluid state, where R is selected from the group consisting of methyl and ethyl radicals. By fluid state, it is meant that the reaction may be conducted in liquid or vapor phase. This bromination proceeds according to the following equation:

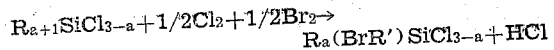

In the above equation R' represents $CH_2$ or $C_2H_4$ radicals.

The chlorine and bromine may be contacted with the silane with the latter in liquid phase at room temperature or above, preferably at a temperature below about 60° C. It has been found that, for example, $(CH_3)_3SiCl$ and $Br_2$ do not react even at reflux temperature in the presence of light. If, however, $(CH_3)_3SiCl$, $Br_2$ and $Cl_2$ are contacted in accordance herewith, reaction proceeds smoothly at room temperature.

If desired, a mixture of chlorine and bromine may be contacted with the alkylsilane. Alternatively, the bromine may be dissolved in the alkylsilane and chlorine bubbled into the mixture.

Alternatively, the chlorine and bromine may be contacted with the silane with the latter in vapor phase. When vapor phase bromination is employed it is preferred to maintain the temperature between the boiling point at the pressure employed of the organosilane being brominated, and that of the brominated product. The brominated product is condensed as formed, whereby the product automatically is removed from the reaction zone.

The bromination may, if desired, be catalyzed by exposing the reaction mixture to light.

It might be expected that there would be a random distribution of chlorine and bromine on the alkyl radicals and that HBr and CH1 would be obtained as by-products. However, contrary to such an expectation a selective type of reaction occurs. In this reaction the chlorine becomes selectively bonded to the hydrogen, thus forming by-produced hydrogen chloride. This is a distinct advantage of the present invention since all the bromine is used to form bromides. The possible yield of bromides is thus twice the expected yield.

The novel bromomethylsilanes of the present invention are liquids. The bromomethylsilanes which contain hydrolyzable chlorine may be hydrolyzed and condensed to obtain the methylbromomethylsiloxane which is useful as a lubricant and which may be employed to lubricate relatively moving metallic parts.

The compound $(CH_3)_3BrCH_2Si$ obtained by brominating tetramethylsilane has utility as an intermediate in the production of other organo-silicon materials. Thus, $(CH_3)_3BrCH_2Si$ may be reacted with anhydrous potassium acetate dissolved in glacial acetic acid to produce

This is a typical metathesis of the type disclosed in my copending application, Serial Number 36,811 filed July 2, 1948, now U. S. Patent 2,582,568.

Alpha-$C_2H_5BrC_2H_4SiCl_2$, obtained by brominating $(C_2H_5)_2SiCl_2$, may be used to produce a vinylsilane by dehydrobromination by conventional methods for dehydrohalogenation.

The following examples illustrate the method of the present application.

Example 1

119 parts by weight of trimethylchlorosilane was placed in a reaction chamber and illuminated. To this silane at 25° C. there were added 5 parts of bromine. Chlorine was then passed through the dark red solution, which had resulted, until the solution became colorless. 46.5 parts of bromine were then added and the flow of chlorine was continued for about 3 hours until the mixture was colorless.

The product was distilled and found to contain 61 parts of $(CH_3)_3SiCl$ with a boiling point of 56.5° C., a trace of $(CH_3)_2ClCH_2SiCl$ with a boiling point of 115° C. and 75 parts of the desired $(CH_3)_2BrCH_2SiCl$. This latter product had a boiling point of 130° C., a refractive index at 25° C. of 1.4630, a density of 1.375 at 25° C., and a specific refraction of 0.2002. There was also obtained about 15 grams of high boiling product which decomposed on distilling at atmospheric pressure. No silicon bromide was found to have been produced.

*Example 2*

258 parts by weight of dimethyldichlorosilane was brominated with 79.5 parts of bromine using chlorine by the procedure described in Example 1.

Distillation of the product yielded 72 parts of $CH_3BrCH_2SiCl_2$. This compound had a boiling point of 140 to 141° C., a refractive index at 25° C. of 1.4750, a density at 25° C. of 1.57 and a specific refraction of 0.170. $CH_3Br_2CHSiCl_2$ was obtained. This compound had a boiling point of 85 to 91° C. at 25 mm. pressure and a refractive index at 25° C. of 1.1585. Unreacted dimethyldichlorosilane was recovered.

*Example 3*

213 parts by weight of tetramethylsilane was brominated at reflux temperatures with 99 parts of bromine using chlorine by the procedure described in Example 1 using a reflux condenser cooled with solid $CO_2$ and acetone.

The product was washed with water and distilled to yield 103 parts of $(CH_3)_3BrCH_2Si$. This compound had a boiling point of 115°–116° C. at 748 mm. and a refractive index of 1.442 at 25° C.

*Example 4*

366.5 parts by weight of diethyldichlorosilane was brominated with 93 parts of bromine at a temperature of 40 to 50° C. by the procedure described in Example 1.

Distillation yielded 160 parts of the monobrominated derivatives, $C_2H_5BrC_2H_4SiCl_2$. Both the alpha and beta isomers were obtained. The alpha isomer had a boiling point of 110° C. at 95 mm., a refractive index of 1.4772 at 25° C., a density of 1.41 at 25° C. and a specific refraction of 0.200. The beta isomer had a boiling point of 128° C. at 95 mm., a refractive index of 1.4908 at 25° C., a density of 1.45 at 25° C., and a specific refraction of 0.200. A residue of polybrominated material was also obtained.

*Example 5*

542 parts by weight of trimethylchlorosilane and 402 parts of bromine were mixed, vaporized and fed into the bottom of a reaction zone. Chlorine was introduced into this mixture until the dark red color disappeared. The temperature of the reaction chamber was maintained between the boiling point of trimethylchlorosilane and the boiling point of dimethylbromomethylchlorosilane, i. e. 57° to 130° C.

The product was distilled and found to contain 66 parts of unreacted $(CH_3)_3SiCl$, 582 parts of the desired $(CH_3)_2BrCH_2SiCl$ with the properties described in Example 1. There was also obtained 244 parts of a polybrominated residue.

That which is claimed is:

1. The method which comprises contacting chlorine and bromine with a compound of the general formula $R_{a+1}SiCl_{3-a}$ in fluid state, where $a$ has a value of from 2 to 4 inclusive and R is selected from the group consisting of methyl and ethyl radicals, whereby there is produced a composition of the general formula $R_a(BrR')SiCl_{3-a}$ where $a$ has a value of from 1 to 3 inclusive, and R' is a radical selected from the group consisting of $CH_2$ and $C_2H_4$ radicals.

2. The method in accord with claim 1 in which the reaction is conducted in liquid phase.

3. The method in accord with claim 2 where R represents a methyl radical and R' represents $CH_2$.

4. The method in accord with claim 2 where R represents an ethyl radical and R' represents $C_2H_4$.

5. The method in accord with claim 1 in which the reaction is conducted in vapor phase.

6. The method in accord with claim 5 where R represents a methyl radical and R' represents $CH_2$.

JOHN L. SPEIER, JR.

References Cited in the file of this patent

UNITED STATES PATENTS

| Number | Name | Date |
|---|---|---|
| 2,572,402 | Speier | Oct. 23, 1951 |

OTHER REFERENCES

Krieble et al., Jour. Am. Chem. Soc., vol. 67, Oct. 1945, pp. 1810–12.

Whitmore, Jour. Am. Chem. Soc., vol. 68 (1946), pp. 481–84.

Vandervort, Jour. Am. Chem. Soc., vol. 70 (1948), page 3148.

Speier et al., Jour. Am. Chem. Soc., vol. 70 (1948), pp. 1117–19.

Speier, Jour. Am. Chem. Soc., vol. 73 (1951), pp. 826–27.